United States Patent [19]

Kumar et al.

[11] Patent Number: 5,057,619

[45] Date of Patent: Oct. 15, 1991

[54] SILOXANE INIFERTER COMPOUNDS, BLOCK COPOLYMERS MADE THEREWITH AND A METHOD OF MAKING THE BLOCK COPOLYMERS

[75] Inventors: Ramesh C. Kumar; Milton H. Andrus, Jr.; Mieczyslaw H. Mazurek, all of St. Paul, Minn.

[73] Assignee: Minnesota Mining and Manufacturing Co., St. Paul, Minn.

[21] Appl. No.: 660,979

[22] Filed: Feb. 26, 1991

Related U.S. Application Data

[63] Continuation of Ser. No. 393,550, Aug. 14, 1989, abandoned.

[51] Int. Cl.$^5$ .................. C07C 51/16; C07C 315/00; C08G 77/04; C08G 77/22
[52] U.S. Cl. .................................. 556/420; 556/429; 528/26; 528/28; 528/30; 522/54; 522/57
[58] Field of Search ........................... 528/28, 26, 30; 556/420, 429; 522/54, 57

[56] References Cited

U.S. PATENT DOCUMENTS

| | | | |
|---|---|---|---|
| 2,938,046 | 5/1960 | Morehouse | 556/420 |
| 3,906,018 | 9/1975 | Ostrozynski | 556/420 |
| 4,046,795 | 9/1977 | Martin | 556/429 |
| 4,269,963 | 5/1981 | Homan et al. | 556/429 |
| 4,584,356 | 4/1986 | Crivello | 525/479 |
| 4,659,777 | 4/1987 | Riffle et al. | 52/100 |
| 4,677,169 | 6/1987 | Crivello | 525/479 |
| 4,689,289 | 8/1987 | Crivello | 430/270 |
| 4,728,571 | 3/1988 | Clemens et al. | |
| 4,822,850 | 4/1989 | Yashuda et al. | 556/420 |
| 4,851,492 | 7/1988 | Panster et al. | 556/420 |

FOREIGN PATENT DOCUMENTS

| | | |
|---|---|---|
| 0286376 | 4/1988 | European Pat. Off. . |
| 291297 | 11/1988 | European Pat. Off. . |
| 0386615 | 9/1990 | European Pat. Off. . |
| 3606983 | 9/1987 | Fed. Rep. of Germany . |
| 3606984 | 9/1987 | Fed. Rep. of Germany . |
| 0124879 | 3/1987 | Japan . |
| 0129410 | 1/1988 | Japan . |
| 63-43906 | 2/1988 | Japan . |

OTHER PUBLICATIONS

Vanderbilt Rubber Handbook, edited by G. S. Winspear, NY, 1958.
GC Hawley, Condensed Chemical Dictionary, p. 902.
Shabael's, B. M.; Rudkovskaya, G. D.; Viasov, G. P.; 1988, 30(4), 278-81 (Russ) discusses p-bis(-glycidylamino)diphenyl disulfide as iniferters and carbo chain macroinitiators based thereupon.
Inoue, et al., J. Appl. Poly. Sci., 35, 2039 (1988).
Inoue, et al., Journal of Polymer Science Part A, 26, 1077-1092 (1988).
Otsu et al., "Living Mono- and Biradical Polymerizations in Homogeneous System Synthesis of AB and ABA Type Block Copolymers", *Polymer Bulletin*, 11, 135-142 (1984).
Otsu et al., "Living Radical Polymerizations in Homogeneous Solution by Using Organic Sulfides as Photoiniferters", *Polymer Bulletin*, 7, 45-50 (1982).
*Experimental Methods in Polymer Chemistry*, Wiley and Sons, (1981), Chapter 3 entitled "Molecular Weight Averages", pp. 57-61.
*Practice of Gel Permeation Chromatography*, Wiley and Sons, (1979), "Modern Size Exclusion Liquid-Chromatography" no copy provided.
"Polymer Separation and Characterization by Thin-Layer Chromatography", by Hiroshi Inagaki, Kyoto University Kyoto, published in "Advance in Polymer Science", vol. 24, Springer-Verlage Berlin Heidelberg, (1977).

(List continued on next page.)

Primary Examiner—Marion E. McCamish
Assistant Examiner—Susan Berman
Attorney, Agent, or Firm—Gary L. Griswold; Walter N. Kirn; Janice L. Dowdall

[57] ABSTRACT

The present invention provides novel siloxane iniferter compounds, block copolymers made therewith, and a method of making the block copolymers. The siloxane iniferter compounds can be represented by the formula

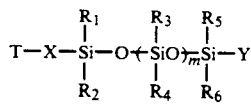

wherein T and X are organic groups selected so that the T-X bond is capable of dissociating upon being subjected to an appropriate energy source to form a terminator free radical of the formula T and an initiator free radical.

$r_1$, $R_2$, $R_5$ and $R_6$ are monovalent moieties selected from the group consisting of hydrogen, $C_{1-4}$ alkyl, $C_{1-4}$ alkoxy and aryl which can be the same or are different;

$R_3$ and $R_4$ are monovalent moieties which can be the same or different selected from the group consisting of hydrogen, $C_{1-4}$ alkyl, $C_{1-4}$ fluoroalkyl including at least one fluorine atom and aryl;

Y is selected from the group consistign of -X-T and -Z wherein X and T are defined above and Z is an organic moiety that will not dissociate to form free radicals when subjected to said energy source; and m is an integer of at least 10.

The initiator free radical is capable of initiating free radical polymerization of free radically polymerizable monomer. The terminator free radical is insufficiently capable of initiating free radical polymerization of free radically polymerizable monomer but is capable of rejoining with the initiator free radical or a free radical polymer segment free radically polymerized with the initiator free radical.

8 Claims, No Drawings

OTHER PUBLICATIONS

Noshay and McGrath, "Block Copolymers", Academic Press, New York, (1977), pp. 156–162, 278, 410.

Saam, Ward, and Fearson, "Polystyrene-polydimethylsiloxane Multiblock Copolymers", Advanc. Chem. Ser. No. 129, 239–47 (1973).

Chemical Abstract No. 105: 173534s, 60(3), 81–93, 1986, Inoue et al.

Inoue et al. article Photografting of Vinyl Monomers onto Diethyldithiocarbamated Polydimethysiloxanes 60(3), 81–93, 1986.

Chemical Abstract 108: 6649p DE 3,606,984 10 Sep. 1987, Eichenauer.

Chemical Abstract 108: 6650g DE 3,606,983 10 Sep. 1987, Eichenauer.

Chemical Abstract No. 109:P 38429d JP 63 57,642.

Chemical Abstract No. 109: 38622m, J Appl. Polym. Sci. 1988, 35 (8), 2039–2051.

Article Block Copolymers Derived from Azobiscyanopentanoic Acid XI. Properties of Silicone-PMMA Block Copolymer Prepared via Polysiloxane (Azobiscyanopentanamide).

Chemical Abstract No. 109: 55479n, JP 63 57,644.

Article, J Poly. Sci. Chem. 24, 1197–1215 (1986), Polydimethylsiloxane-Vinyl Block Polymers.

Chemical Abstract No. 112: 141458y, JP 01,245,007, 29 Sep. 1989.

Japan Kokai Tokkyo KO 1-245007, Tarumori.

Himori 64–29410.

SILOXANE INIFERTER COMPOUNDS, BLOCK COPOLYMERS MADE THEREWITH AND A METHOD OF MAKING THE BLOCK COPOLYMERS

This is a continuation of application Ser. No. 07/393,550 filed Aug. 14, 1989, now abandoned.

TECHNICAL FIELD

This invention relates to siloxane iniferter compounds, vinyl-siloxane block copolymers made therewith, and a method of making the block copolymers.

BACKGROUND ART

Various methods of producing vinyl-siloxane block copolymers have been discussed in the literature including anionic polymerization, condensation polymerization and thermal free radical polymerization. However, the methods discussed in the art are complex and are limited as to the selection of monomers which can be successfully polymerized. Anionic polymerization, for example, is limited to the use of monomers such as nonpolar vinyl and diene compounds. Such limitations of anionic polymerization are discussed in an article by Noshay and McGrath, entitled "Block Copolymers", Academic Press, New York, 1977, pp 157, 278, 410. Limitations in the production of vinyl-siloxane block copolymers are also discussed in an article by Saam, Ward and Fearon, entitled "Polystyrene-polydimethylsiloxane Multiblock Copolymers", Advanc. Chem. Ser., No. 129, 239–47 (1973). The Saam article discusses the platinum-catalyzed polycondensation of $\alpha$, $\omega$-hydrogen terminated polydimethyl siloxane and $\alpha$, $\omega$-vinyl terminated polystyrene utilizing anionic polymerization for the synthesis of the $\alpha$, $\omega$-vinyl terminated polystyrene and the drawbacks associated therewith.

We believe that block copolymers of siloxane and vinyl monomers which can be easily synthesized and tailored can combine the properties of two dissimilar polymers thereby providing unique materials which potentially have broad utility in a wide range of areas.

The present invention provides novel siloxane iniferter compounds and vinyl-siloxane block copolymers made by utilization of the novel siloxane iniferter compounds as a means of promoting, controlling and terminating polymerization of the block copolymers.

The term "iniferter" refers to a chemical compound that has a combined function of being a free radical initiator, transfer agent, and terminator, the term "iniferter" being a word formed by the underlined portions of the terms identifying these functions. This term and its use in a production of block copolymers is well known, particularly because of the work of Takayuki Otsu of the Department of Applied Chemistry, Osaka City University, Osaka, Japan. This work is discussed, for example, in an article by Otsu et al entitled "Living Radical Polymerizations in Homogeneous Solution by Using Organic Sulfides as Photoiniferters", Polymer Bulletin, 7, 45–50 (1982), an article by Otsu et al entitled "Living Mono- and Biradical Polymerizations in Homogeneous System Synthesis of AB and ABA Type Block Copolymers", *Polymer Bulletin*, 11, 135–142 (1984), and in European Patent No. 0286376, published October 12, 1988. Despite the rather detailed description of making other block copolymers according to such disclosures, there is no disclosure of the novel siloxane iniferter compounds or the vinyl-siloxane block copolymers made therewith herein claimed.

Copending U.S. application Ser. No. 07/212,594, Ali et al., filed June 28, 1988, (assigned to the assignee of the present case) discloses the use of iniferter technology in the preparation of acrylic block copolymers having the requisite physical properties making them suitable for use in pressure-sensitive adhesive compositions. The control of the polymerization permits tailoring of the reinforced acrylic block copolymer to provide a balance of adhesion, cohesion, stretchiness and elasticity to make a successful pressure-sensitive adhesive. Copending U.S. application Ser. No. 07/212,594, filed June 28, 1988, Ali et al, does not disclose siloxane iniferter compounds or the use of such iniferter compounds in the synthesis of vinyl-siloxane block copolymers.

Copending U.S. application Ser. No. 07/212,593, filed June 28, 1988, Andrus Jr. et al., (also assigned to the assignee of the present case) discloses the use of iniferter technology in the preparation of acrylic block copolymers which can be tailored to provide optical clarity and resistance to oxidative and photochemical degradation. The acrylic block copolymers disclosed in copending U.S. application Ser. No. 07/212,593 are employed to make shaped articles, sheet materials, and the like. Copending U.S. application Ser. No. 07/212,593 also does not disclose siloxane iniferter compounds or the use of such iniferter compounds in the synthesis of vinyl-siloxane block copolymers.

Polysiloxane grafted copolymers useful as release coatings prepared by a non-iniferter method that do not require a curing step have been described (U.S. Pat. No. 4,728,571) wherein controlled and predictable release is achieved through variation in the number and the length of the polysiloxane grafts.

Copending U.S. application Ser. No. 07/278,283, filed Nov. 30, 1988, Mertens et al., (also assigned to the assignee of the present case) discloses release coatings for pressure sensitive adhesive tape comprising copolymers of free radically polymerizable vinyl monomer, polar monomer in a sufficient amount to impart a hydrated $T_g$ of $-15°$ C. to 35° C. and a difference of at least 20° C. between the hydrated and actual $T_g$s, and siloxane-based polymer of a type and in an amount that will impart a satisfactory release value. The release coatings are capable of being written effectively with water and oil based pen inks.

Various methods of preparing block copolymers of silicone and vinyl monomers have been described in the art.

Crivello, U.S. Pat. Nos. 4,584,356; 4,677,169; and 4,689,289, teaches the thermal preparation of vinylsiloxane block copolymers. Crivello teaches a thermal method involving the use of a macromolecular siloxane initiator (U.S. Pat. No. 4,584,356) and describes utility as E-beam resists (U.S. Pat. No. 4,677,169) and positive or negative resists (U.S. Pat. No. 4,689,289). Crivello does not disclose the use of iniferter technology in the preparation of vinyl-siloxane block copolymers. In addition, Crivello's thermal preparation method can only be used in the synthesis of block copolymers having simple AB or ABA architecture and not in the preparation of block copolymers having more complicated architecture such as CAB,CABAC, etc.

Eichenauer, et al describes condensation of either a semitelechelic hydroxy-terminal vinyl polymeric segment with an acetoxy-terminal siloxane (DE 3,606,984) or a semitelechelic carboxy-terminal vinyl polymeric segment with an aminopropyl-terminal siloxane (DE 3,606,983). Japanese laid-open applications 63-57642 and 63-57644 describe the use of peroxy ester terminated siloxanes as macroinitiators for thermal preparation of vinyl-siloxane block copolymers. H. Inoue, et al, J. Appl. Poly. Sci, 35, 2039 (1988) describes properties of poly(methyl methacrylate)/siloxane block copolymers obtained from thermal polymerization using an azo-containing siloxaneamide macroinitiator.

Inoue, Ueda and Nagai; Journal of Polymer Science Part A, 26, 1077-1092 (1988) is another reference which discusses the thermal preparation of block copolymers. Inoue teaches the thermal preparation of silicone-vinyl block copolymers by radical polymerization of vinyl monomers such as methylmethacrylate, styrene, etc. in the presence of polysiloxane azobiscyanopentaamides which serve as macroazoinitiators. Inoue et al, like Crivello, does not teach the use of iniferter technology in the preparation of vinyl-siloxane block copolymers.

These methods, while useful, involve reactions that are not easily controlled. Since the reactions are not easily controlled, the copolymers formed thereby cannot be easily tailored.

The article entitled "Block Copolymers" by Noshay and McGrath, Academic Press, New York, 1977, pp 156-162, "Block Copolymers—Overview and Critical Survey" which is hereby incorporated by reference discusses phase separation as it applies to silicone-vinyl block copolymers. Noshay does not teach the preparation of vinyl-siloxane block copolymers by use of iniferter technology. Rather, Noshay teaches the preparation of vinyl-siloxane block copolymers by use of anionic polymerization and condensation polymerization methods.

A need therefore exists for a convenient general route of synthesis of vinyl-siloxane block copolymers which permits the tailoring of the block copolymers so that a wide spectrum of physical properties can be introduced. A need also exists for such a method wherein polymeric architecture beyond simple AB and ABA architecture can be obtained. Despite the rather detailed description of making block copolymers according to such disclosures, there is no disclosure of the use of photoiniferter technology in the preparation of the vinyl-siloxane block copolymers herein claimed or the novel siloxane iniferter compounds used in their preparation.

We have found a novel siloxane iniferter which can be used as a means of promoting, controlling and terminating polymerization of a vinyl-siloxane block copolymer.

The siloxane iniferters useful in preparing vinyl-siloxane block copolymers are "macro" iniferters, as opposed to the iniferters of Otsu; Ali et al, U.S. application Ser. No. 07/212,594; and Andrus Jr., et al., U.S. application Ser. No. 07/212,593, which are low molecular weight iniferters which do not contain a polymerized silicone segment or any silicon for that matter. It is not apparent from the above references that a polymerized silicone or siloxane segment could be contained in an iniferter. Both the preparation and function of the "macro" siloxane iniferters useful in preparing vinyl-siloxane copolymers differ from the iniferters described in the references above.

The selection of the endblocker which can cooperate with the siloxane midblock segment to form the "macro" siloxane iniferter useful in preparing tailor-made vinyl siloxane block copolymer is very critical and must be made in a way which will not diminish the effectiveness of the siloxane segment. The preparation of such a "macro" iniferter including the determination of useful endblocker in its preparation is not suggested by any of the above references.

The polymerized siloxane segment introduced into the "backbone" of the vinyl-siloxane copolymer by the photoiniferter polymerization technique is a midblock component. The endblocker, which caps the siloxane segment, is selected such that it reacts with a soft nucleophile in order to form a "macro" siloxane iniferter compound. The bond between the photoiniferter and endblocker is broken upon exposure to ultraviolet radiation resulting in an initiator free radical and a terminator free radical. The initiator free radical is capable of polymerizing free radically polymerizable vinyl monomer in order to yield vinyl siloxane copolymer.

With respect to Ser. No. 07/212,594, Ali et al. and Ser. No. 07/12,593, Andrus Jr., et al., both the midblocks and endblocks comprise polymerized acrylic monomers. It is not apparent that a polymerized siloxane segment could be included in an iniferter and polymer formed therewith. Otsu also does not teach "macro" siloxane iniferters or the preparation of vinyl-siloxane copolymers.

By using photoiniferter polymerization technqiues, it is possible to obtain more complicated polymer architectures than are available according to the thermal method of Crivello. The thermally prepared block copolymers of Crivello cannot possess architecture beyond AB and ABA.

In addition, photoiniferter polymerization reactions are much more efficient than thermal polymerization methods in terms of providing cleaner block copolymers which are free from unwanted homopolymers. Moreover, photoiniferter polymerization methods can be used to form block copolymers ranging from very low to very high molecular weights. The photoinifierter method permits the tailoring of the siloxane midblock as well as the endblocks to satisfy customer needs which is not possible using Crivello's thermal method.

BRIEF DESCRIPTION OF THE INVENTION

The present invention provides for the first time, to our knowledge, a novel, convenient general route to vinyl-siloxane block copolymers which can be reliably produced. Block copolymers often have the desired properties of both block constituents without the undesirable properties. The vinyl-siloxane block copolymers of the present invention generally possess such useful properties as low surface energy, high modulus without brittleness, gas and vapor permeability, weatherability, excellent thermal stability and high lubricity. The vinyl-siloxane block copolymers of the invention can be used in the areas of release coatings for pressure sensitive adhesives, surface active agents, permselective membranes, impact modifiers, fabric treatments, thermoplastic low temperature elastomers, controlled drug release carriers, packaging, medical tubing, biomedical protheses, etc. Copending, concurrently filed U.S. Ser. No. 07/393,557, Kumar, et al, General Purpose Siloxane Release Coatings, hereby incorporated by reference, teaches iniferter prepared vinyl-siloxane release coatings for flexible substrates.

The present invention provides novel siloxane iniferter compounds which can be used in making tailor-made vinyl-siloxane block copolymers and a method of making the block copolymers. The control of the polymerization provided by the novel siloxane iniferter compounds permits "tailoring" of the vinyl-siloxane block copolymers so that a wide spectrum of physical properties can be introduced. Polymerization is accomplished by sequential polymerization steps.

The siloxane iniferter compounds of the present invention are "macro" iniferters capable of predictably inserting a siloxane segment into a vinyl block copolymer backbone of the AB or ABA type of polymer architecture. The siloxane segment is inserted by a controllable process which permits the siloxane functionality and the vinyl functionality to be balanced to meet the performance requirements of the block copolymer which is normally furnished as a coating material. In addition, it is possible to extend beyond the simple AB and ABA architecture to obtain more complicated CAB, CABAC, etc., copolymer structures which is not possible when using non-iniferter polymerization techniques. The siloxane iniferter compound of the invention is formed with an end blocker which not only controls the molecular weight of the siloxane segment, but which is also capable of being functionalized with the siloxane segment. It is possible using the siloxane iniferter compound of the present invention to vary both the molecular weight and weight percent of the siloxane block present as well as the molecular weight and composition of the vinyl block or blocks. Thus, the various properties of the block copolymers of the invention can be tailored depending upon the intended end use of each particular copolymer.

DETAILED DESCRIPTION OF THE INVENTION

1. Siloxane Iniferter Compound

The siloxane iniferter compound of the present invention can be represented by the general formula

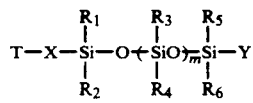

wherein T and X are organic groups selected so that the T-X bond is capable of dissociating upon being subjected to an appropriate energy source to form a terminator free radical of the formula T. and an initiator free radical of the formula

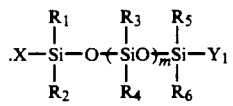

the initiator free radical being sufficiently reactive to initiate free radical polymerization of free radically polymerizable monomer and the terminator free radical being insufficiently capable of initiating free radical polymerization of free radically polymerizable monomer but being capable of rejoining with the initiator free radical or a free radical polymer segment free radically polymerized with the initiator free radical;

$R_1$, $R_2$, $R_5$ and $R_6$ are monovalent moieties which can be the same or different selected from the group consisting of hydrogen, $C_{1-4}$ alkyl, $C_{1-4}$ alkoxy, and aryl;

$R_3$ and $R_4$ are monovalent moieties which can be the same or different selected from the group consisting of hydrogen, $C_{1-4}$ alkyl, $C_{1-4}$ fluoroalkyl including at least one fluorine atom, and aryl;

$R_1$, $R_2$, $R_3$, $R_4$, $R_5$ and $R_6$ are selected so that they do not prevent said initiator free radical from initiating free radical polymerization or the combining of said terminator free radical with said initiator free radical or a polymer free radical segment including the initiator free radical;

Y is selected from the group consisting of -X-T and -Z wherein X and T are as defined above and Z is an organic moiety that will not dissociate to form free radicals when subjected to the energy source;

$Y_1$ is selected from the group consisting of -X. and -Z; and m is an integer of at least 10.

As indicated above, T and X are organic groups selected so that the T-X bond is capable of dissociating upon being subjected to an appropriate energy source to form free radicals.

Useful organic groups T include but are not limited to xanthates and dithiocarbamates. Examples of xanthates useful as the organic group T include xanthates of the formula:

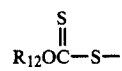

wherein $R_{12}$, is a monovalent moiety selected from the group consisting of hydrogen, $C_{1-4}$ alkyl, aryl and substituted aryl. Preferably, the organic group T has the formula

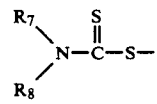

wherein $R_7$ and $R_8$ are monovalent moieties which can be the same or different selected from the group consisting of hydrogen, $C_{1-4}$ alkyl, $C_{1-4}$ fluoroalkyl including at least one fluorine atom, aryl and substituted aryl. $R_7$ and $R_8$ are selected so they will not prevent the initiator free radical from initiating free radical polymerization or the combining of the terminator free radical with the initiator free radical or a polymer free radical segment including the initiator free radical. Preferably $R_7$ and $R_8$ are ethyl radicals for reasons of commercial availability.

A primary function of the organic group X is its ability to provide an initiator free radical upon dissociation. A secondary function of the organic group X is to provide hydrolytic stability to the iniferter, since a T-Si bond would be easily hydrolyzed. Preferably, the organic group X is a divalent radical selected from the group consisting of alkylene, arylalkylene and arylene.

X can also preferably comprise a divalent species having the general formula

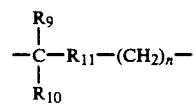

wherein
$R_9$ and $R_{10}$ can be the same or different and are selected from the group consisting of hydrogen and $C_{1-6}$ alkyl;
$R_{11}$ is a divalent radical selected from the group consisting of $C_{1-7}$ alkylene and phenylene; and
n is an integer of at least 1.

X can also preferably be selected from the group consisting of

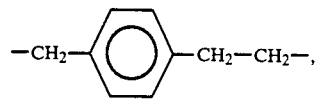

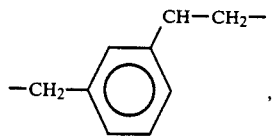

and mixtures thereof.

Most preferably X is selected from the group consisting of

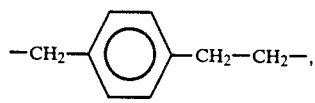

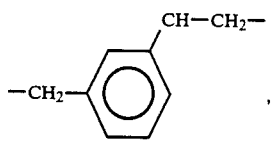

and mixtures thereof for reasons of commercial availability and ease of synthesis of the siloxane iniferter compound.

As indicated above, Y is selected from the group consisting of -X-T and -Z wherein -X-T and -Z are as defined above. If Y is selected to be -X-T, a "macro" siloxane diiniferter is formed which can be used in the preparation of ABA, CABAC, etc. vinyl-siloxane block copolymers. If Y is selected to be -Z, a "macro" siloxane monoiniferter is formed which can be used in the preparation of AB, CAB, etc. vinyl siloxane block copolymers.

Z has been defined above as an organic moiety that will not dissociate to form free radicals when subjected to an energy source. Preferably, Z is selected from the group consisting of alkyl, alkoxy, alkylamino, aryl, hydroxyl, and fluoroalkyl.

As indicated above, m should be an integer of at least 10 in order that the block copolymer formed using the siloxane iniferter compound contains a siloxane segment of sufficient size to impart some of the properties of the siloxane segment to the block copolymer. It is possible for m to have a value less than 10. However, if m is less than 10, the siloxane segment would have a negligible effect on the properties of the block copolymer. Preferably, m is an integer ranging from about 20 to about 200 in order that the siloxane segment is of sufficient size to impart some of the properties of the siloxane segment to the block copolymer.

2. Siloxane Block Copolymers

The block copolymers of the invention are typically AB and ABA type copolymers. However, block copolymers of the invention can also have the following architecture: CAB, CABAC, etc. The block copolymers of the present invention can be represented by the general formula

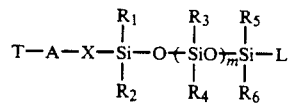

wherein the block copolymers are made by the utilization of an iniferter represented by the general formula

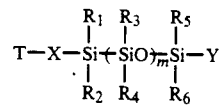

wherein:

A comprises at least one polymer block consisting essentially of polymerized free radically polymerizable monomers;

T and X are organic groups selected so that the T-X bond is capable of dissociating upon being subjected to an appropriate energy source to form a terminator free radical of the formula T. and an initiator free radical of the formula

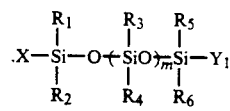

the initiator free radical being sufficiently reactive to initiate free radical polymerization of free radically polymerizable monomer and the terminator free radical being insufficiently capable of initiating free radical polymerization of free radically polymerizable monomer but capable of rejoining with the initiator free radical or a free radical polymer segment free radically polymerized with the initiator free radical;

$R_1$, $R_2$, $R_5$ and $R_6$ are monovalent moieties which can be the same or different selected from the group consisting of hydrogen, $C_{1-4}$ alkyl, $C_{1-4}$ alkoxy and aryl;

$R_3$ and $R_4$ are monovalent moieties which can be the same or different selected from the group consisting of hydrogen, $C_{1-4}$ alkyl, $C_{1-4}$ fluoroalkyl including at least one fluorine atom, and aryl;

$R_1$, $R_2$, $R_3$, $R_4$, $R_5$, and $R_6$ are selected so that they do not prevent the initiator free radical from initiating free radical polymerization or the combining of the terminator free radical with the initiator free radical or a polymer free radical segment including the initiator free radical;

L is selected from the group consisting of -X-A-T and -Z wherein X and T are defined above and Z is an organic moiety that will not dissociate to form free radicals when subjected to said energy source;

Y is selected from the group consisting of -X-T and -Z wherein X and T are as defined above and Z is an organic moiety that will not dissociate to form free radicals when subjected to the energy source;

$Y_1$ is selected from the group consisting of -X. and Z; and m is an integer of at least 10.

The weight ratio of vinyl polymer block to siloxane polymer block of the copolymer can vary. The preferred block copolymers are those wherein the weight ratio of vinyl polymer block to siloxane polymer block ranges from about 80:20 to 50:50, most preferably 70:30 to 60:40, in order that the copolymer possesses properties inherent to each of the different blocks.

The preferred block copolymers are those wherein the free radical polymerizable monomer is selected from the group consisting of styrene, methyl methacrylate, methyl acrylate, acrylic acid, vinyl acetate, acrylonitrile, isobornyl methacrylate, N-vinyl pyrrolidone, butyl methacrylate, isopropyl methacrylate, N-methyl perfluorooctane sulfonamido ethyl acrylate, N-ethyl perfluorooctane sulfonamido ethyl acrylate, hydroxy propyl acrylate, hydroxy ethyl acrylate, and mixtures thereof.

Most preferably, A comprises a copolymer which consists essentially of methyl acrylate and acrylic acid.

A, which is defined above, can comprise at least one homopolymer block, copolymer block or multiblock copolymer. The selection of the composition of A is typically based upon the intended use of the block copolymer of the present invention and the properties the block copolymer must possess in order to accomplish its intended purpose. If A comprises one block, a polymer having AB and ABA architecture will be obtained depending upon whether a siloxane monoiniferter compound or siloxane diiniferter compound is used, respectively.

A can comprise two or more polymer blocks formed from two or more separate monomer charges, respectively. For example, A can comprise polymer block A' which consists essentially of a polymerized free radically polymerizable first monomer charge and polymer block A" which consists essentially of a polymerized free radically polymerizable second monomer charge. Each monomer charge can comprise one or more free radically polymerizable monomers. If A comprises two blocks, a polymer having CAB or CABAC architecture will be obtained depending upon whether a siloxane monoiniferter compound or siloxane diiniferter compound is used, respectively.

BEST MODE FOR CARRYING OUT THE INVENTION

3. Preparation of Siloxane Iniferter Compound

The siloxane iniferter compound of the present invention is referred to as a "macro" iniferter due to the inclusion of the polymerized siloxane segment. The macro siloxane iniferter compound of the present invention can be prepared as follows.

3(a) Synthesis of End Blocker

The first step in the preparation of the macro siloxane iniferter compound is the synthesis of the endblocker, which is used in the preparation of the polymerized siloxane segment. The synthesis of the endblocker can be represented by the following general formula:

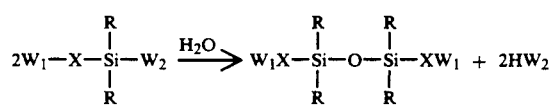

wherein
$W_1$ is selected from the group consisting of Cl, Br and tosylate,
$W_2$ is selected from the group consisting of Cl, Br and alkoxy,
R can be any combination of $R_1$, $R_2$, $R_5$ or $R_6$, as previously defined, and
X is as previously defined.

The above reaction can be carried out in any suitable corrosion resistant vessel such as glass or stainless steel. The above reaction is exothermic and is preferably carried out at room temperature.

The end blocker should be capable of controlling the molecular weight of the polymerized siloxane segment. In addition, the end blocker should be capable of reacting with a nucleophile such as sodium diethyldithiocarbamate in a suitable organic solvent under mild conditions to yield the siloxane iniferter compound of the present invention.

3(b) Polymerization of Siloxane Monomers to Form Siloxane Precursor

The second step in the preparation of the macro siloxane iniferter compound is the polymerization of an organocyclosiloxane monomer by use of the end blocker in order to form a "siloxane precursor" also referred to herein as a "polymerized siloxane segment". An example of a suitable organocylosiloxane monomer is hexamethylcyclotrisiloxane, "$D_3$". The selection of the endblocker is important since it caps one or both ends of the polymerized siloxane segment depending upon whether a difunctional or monofunctional iniferter compound is formed, respectively.

3(b)(1) Preparation of Siloxane Precursor to Siloxane Monoiniferter Compound The preparation of a siloxane precursor to the siloxane monoiniferter compound useful in forming AB, CAB, etc. block copolymers is accomplished by anionic polymerization of cyclic siloxanes having strained ring structure.

Suitable monomers for use in the above-mentioned anionic polymerization are, in general, diorganocyclosiloxanes of the formula

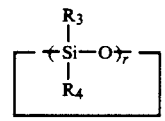

wherein $R_3$ and $R_4$ are as previously defined and wherein r is an integer of 3. The preferred monomer is the cylic siloxane wherein r is an integer of 3 and $R_3$ and $R_4$ are both methyl groups, designated as hexamethylcyclotrisiloxane, "$D_3$".

Initiators of the anionic polymerization reaction are chosen such that redistribution reactions are much slower than chain growth, thus monofunctional living polymer is produced. Suitable initiators include but are not limited to alkyl or aryl lithium compounds containing up to 20 carbon atoms in the alkyl or aryl radical or more, preferably up to 8 carbon atoms. Examples of such compounds include methyl lithium, ethyl lithium, n-butyl lithium, sec-butyl lithium, tert-butyl lithium, phenyl lithium, and 2-ethylhexyl lithium. Examples of additional useful initiators include but are not limited to lithium alkoxides, hydroxides, and amides, as well as triorganosilanolates of the formula

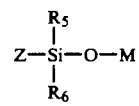

wherein

M is a lithium or benzyltrimethylammonium bis(o-phenylenedioxy)-phenyl cation, the latter cation requiring a coactivator such as water or alcohol, and Z, $R_5$, and $R_6$ are as previously defined.

The above compounds are described by C. L. Lee and O.K. Johannson, J. Polym. Sci., Polym. Chem., 14, 729 (1976), incorporated by reference herein.

The preferred triorganosilanolate initiator is lithium trimethylsilanolate (LTMS) or butyldimethylsilanolate. Preferably, the reaction components comprise both strained cyclic monomer and lithium initiator, thus reducing the likelihood of redistribution reactions and thereby providing siloxane precursor having a narrow molecular weight distribution which is reasonably free of unwanted cyclic oligomers and nonfunctional or difunctional polymers.

For the initiation of the anionic polymerization, an inert, preferably polar, organic solvent can be utilized. Anionic polymerization propagation with a lithium counterion requires either a strong polar solvent such as tetrahydrofuran (THF), dimethyl sulfoxide, or hexamethyl-phosphorous triamide, or a mixture of such a strong polar solvent with a nonpolar aliphatic, cycloaliphatic, or aromatic hydrocarbon solvent such as hexane, heptane, octane, cyclohexane, or toluene. The polar solvent allows the initiator to dissociate and become "activated", thus making propagation possible. If a nonpolar solvent is utilized the initator such as lithium trimethylsilanolate will not dissociate and hence will not become "activated".

Generally, the polymerization can be carried out at a temperature ranging from about $-20°$ C. to about $100°$ C., preferably from about $-10°$ C. to about $50°$ C. Anhydrous conditions and an inert atmosphere such as nitrogen, helium, or argon are required. Termination of the anionic polymerization is, in general, achieved via direct reaction of the living polymeric anion with halogen-containing terminating agents, i.e., functionalized halosilanes of the formula

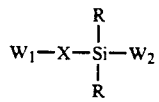

wherein $W_1$, $W_2$, and R are as previously defined.

3(b)(2) Preparation of Siloxane Precursor to Siloxane Diiniferter Compound

The preparation of the novel siloxane precursor compound for use in preparation of the novel siloxane diiniferter compound of the present invention involves an acid or base catalyzed equilibration reaction of diorganocyclosiloxanes having the general formula

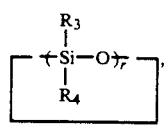

wherein $R_3$, $R_4$, and r are as previously defined, with an end blocker having the general formula

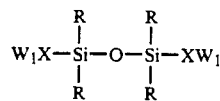

wherein $W_1$, X, and R are as previously defined.

Octamethyl cyclotetrasiloxane, "$D_4$", is especially preferred for the acid or base equilibration reaction due to its commercial availability. Examples of proton acids useful as catalysts include sulfuric acid, ethane sulfonic acid, trifluoromethane sulfonic acid, selenic acid, nitric acid, phosphoric acids, pyrophosphoric acid, and boric acid. An example of a useful carboxylic acid catalyst is trifluoroacetic acid. Lewis acid catalysts useful for polymerization are iron (III) chloride, boron trifluoride, zinc chloride, tin (IV) chloride, etc. Bases useful as catalysts include alkali-metal hydroxides, alkali-metal silanolates, alkali-metal alkoxides, quaternary ammonium hydroxides, tetramethylammonium silanolate, tetrabutylphosphonium silanolate, etc.

Generally, the polymerization can be carried out at a temperature ranging from about $25°$ C. to about $150°$ C., preferably from about $75°$ C. to about $90°$ C.

The selection of an endblocker which will cooperate with the siloxane midblock segment to accomplish the desired overall performance of the block copolymer is important and must be made in a way which will not diminish the effectiveness of the siloxane segment. The end blocks of the siloxane moiety should be able to react with soft nucleophiles such as sodium diethyldithiocarbamate.

3(c) Placement of the Photoiniferter on the Siloxane Precursor

The third step involved in the preparation of the "macro" siloxane iniferter compound is the placement of a photoiniferter on the siloxane precursor, also referred to herein as the "polymerized siloxane segment". The following general reaction demonstrates the placement of the photoiniferter on the polymerized siloxane segment.

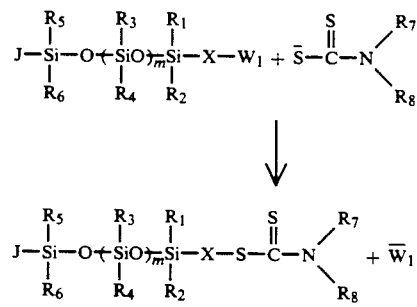

wherein $R_1$, $R_2$, $R_3$, $R_4$, $R_5$, $R_6$, $R_7$, $R_8$, $W_1$, and X are as previously defined and J is selected from the group consisting of -Z and -X-$W_1$.

The incorporation of a photoiniferter on the polymerized siloxane segment involves the reaction of a mono or difunctional siloxane segment with a nucleophile in the presence of a polar organic solvent. Mono or difunctional siloxane segments can be represented by the general formula

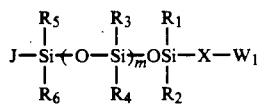

wherein $W_1$, $X$, $R_1$, $R_2$, $R_3$, $R_4$, $R_5$, $R_6$, $J$ and $m$ are as previously defined.

Preferably, $R_1$, $R_2$, $R_3$, $R_4$, $R_5$, and $R_6$ are methyl groups and $W_1$ is a chloro group for reasons of commercial availability.

Useful nucleophiles include, but are not limited to, dithiocarbamates of the general formula

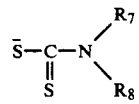

wherein $R_7$ and $R_8$ are as previously defined. Preferably, $R_7$ and $R_8$ are ethyl groups for reasons of commercial availability.

The reaction involving the incorporation of a photoiniferter on the polymerized siloxane segment requires a polar organic solvent such as tetrahydrofuran, chloroform, dimethylsulfoxide or dimethylformamide. The polar solvent is utilized to dissolve the reaction components in order for the reaction to proceed.

Generally, the reaction is carried out at a temperature ranging from about 20° C. to about 45° C., preferably from about 20° C. to about 30° C.

4. Preparation of Siloxane Block Copolymer

The copolymerization of the free radically polymerizable monomer and the polymerized siloxane segment to produce the block copolymer of the present invention is by step-wise free radical polymerization. The free radically polymerizable monomer is dissolved in a suitable inert solvent, if needed, and polymerized by free radical polymerization utilizing the novel siloxane iniferter compound of the present invention as a free radical initiator source. A siloxane monoiniferter compound is used to form block copolymers having AB, CAB, etc., architecture. A siloxane diiniferter compound is used to form block copolymers having ABA, CABAC, etc., architecture. Generally, the weight ratio of the siloxane iniferter compound to the free radically polymerizable monomer ranges from about 2:98 to about 60:40, respectively. Preferably, the weight ratio of the siloxane iniferter compound to the free radically polymerizable monomer ranges from about 20:80 to about 50:50, respectively. Generally, from about 0.01 to about 5 percent by weight of the T group of the siloxane iniferter compound is present based upon the total weight of the free radically polymerizable monomer.

The siloxane iniferter compound of the present invention is caused to dissociate to form free radicals by exposure to an appropriate energy source, preferably, a radiant energy source, most preferably, an ultraviolet radiant energy source. Upon exposure to the energy source, the iniferter which is defined above and represented by the general formula

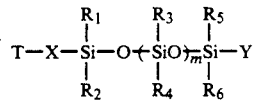

dissociates to form a terminator free radical of the formula T. and an initiator free radical of the formula

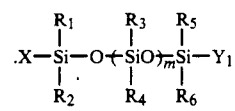

wherein $R_1$, $R_2$, $R_3$, $R_4$, $R_5$, $R_6$, $T$, $X$, $Y$, $Y_1$ and $m$ are as previously defined.

The particular energy source and its intensity are selected to result in the dissociation of the iniferter to free radicals. The intensity and rate of irradiation are chosen to advance the polymerization at a reasonable rate without deleteriously affecting the polymer segment being produced. An ultraviolet light source having a wavelength on the order of 300 to 400 nm spaced approximately 10 cm from the reactants to provide an exposure of 2 mW per square centimeter has been found to produce suitable results. Reaction times on the order of 2 to 50 hours have been found to be typical, depending upon the intensity of the radiation, with faster reaction times being observed at greater intensities.

It should be understood that minor amounts of the monomer forming the A block or blocks may be present as a homopolymer in the copolymer composition of the invention. Such minor amounts of homopolymer may be produced in an unwanted side reaction during polymerization of the copolymer. Such amounts will typically be less than 5 parts by weight of all the homopolymer based upon 100 parts by weight of the copolymer.

The reactants and any solvent employed are charged into an energy source-transparent vessel and therein subjected to the energy source. If the energy source is ultraviolet light radiation, a suitable ultraviolet light-transparent vessel is utilized.

The reaction is preferably conducted in a vessel with agitation to permit uniform exposure of the reactants to the energy source. While most of the reactions have been conducted by employing a batch process, it is possible to utilize the same technology in a continuous polymerization operation.

The reaction mixture may include a suitable inert solvent but it is not necessary since many of the monomeric materials are liquid themselves and may thus be charged into the reaction vessel without utilization of a solvent.

The solvent, if utilized in the free radical polymerization, may be any substance which is liquid in a temperature range of about −10° C. to about 50° C., is substantially transparent to the energy source employed to permit dissociation of the iniferter to form free radicals, is inert to the reactants and product, and will not otherwise adversely affect the reaction. Suitable solvents include water, ketones such as methyl ethyl ketone, alkyl acetates such as ethyl acetate, alkanes such as hexane or heptane, alcohols such as methanol and ethanol, aromatic hydrocarbons such as toluene and benzene, and mixtures of two or more of these. Other solvent systems are useful. The amount of solvent is generally about 30 to 80 percent by weight based on the total weight of the reactants and solvent. In addition to solution polymerization herein described, the copolymerization may be carried out by other well known techniques such as suspension, emulsion and bulk polymerization.

The method of making a block copolymer according to the method of the present invention comprises:

(a) mixing (1) an iniferter represented by the general formula

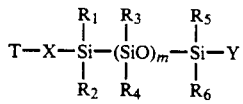

wherein

T and X are organic groups selected so that the T-X bond is capable o dissociating upon being subjected to an appropriate energy source to form a terminator free radical of the formula T and an initiator free radical of the formula

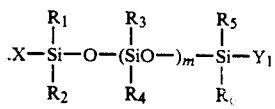

said initiator free radical being sufficiently reactive to initiate free radical polymerization of free radically polymerizable monomer and said terminator free radical being insufficiently capable of initiating free radical polymerization of free radically polymerizable monomer but capable of rejoining with said initiator free radical or a free radical polymer segment free radically polymerized with said initiator free radical;

wherein $R_1$, $R_2$, $R_5$, and $R_6$ are monovalent moieties selected from the group consisting of hydrogen, $C_{1-4}$ alkyl, $C_{1-4}$ alkoxy and aryl which can be the same or are different;

$R_3$ and $R_4$ are monovalent moieties which can be the same or different selected from the group consisting of $C_{1-4}$ alkyl, $C_{1-4}$ fluoroalkyl including at least one fluorine atom and aryl;

$R_1$, $R_2$, $R_3$, $R_4$, $R_5$, and $R_6$ are selected so that they do not prevent said initiator free radical from initiating free radical polymerization or the combining of said terminator free radical with said initiator free radical or a polymer free radical segment including said initiator free radical;

Y is selected from the group consisting of -X-T and -Z wherein X and T are defined above and Z is an organic moiety that will not dissociate to form free radicals when subjected to said energy source;

$Y_1$ is selected from the group consisting of -X. and -Z; and m is an integer of 10 or greater; and (2) a first monomer charge consisting essentially of free radically polymerizable monomer;

(b) exposing the mixture of (a) to an energy source capable of forming free radicals T. and

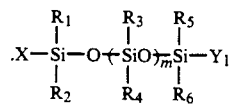

(c) maintaining the exposure of (b) until said free radically polymerizable monomer polymerizes with the radical

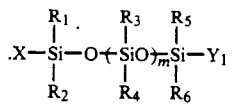

to form a free radical block copolymer segment represented by the formula

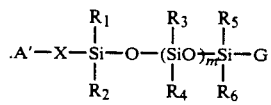

wherein

A' represents a polymer block consisting essentially of polymerized free radically polymerizable monomer;

G is selected from the group consisting of -X-A'. and -Z; and (d) terminating the exposure of (b) whereby

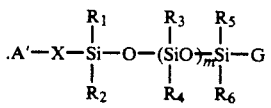

and T. combine to form a block copolymer represented by the formula

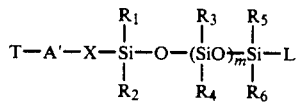

wherein

L is selected from the group consisting of -X-A'-T and -Z, wherein X, A', T, and Z are defined above or alternatively maintaining the exposure of

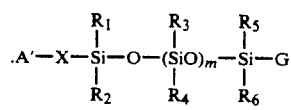

and T. to said energy source;

(e) optionally mixing

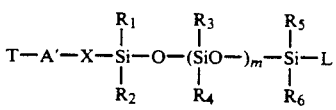

or mixing

-continued

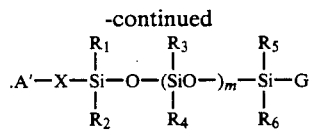

and T. with a second monomer charge consisting essentially of free radically polymerizable monomer in order to form a second mixture;

(f) exposing the mixture of

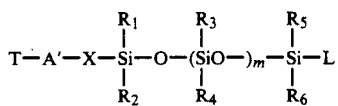

and said second monomer charge to an energy source capable of forming free radical T. and

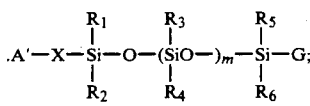

or alternatively maintaining the exposure of T. and

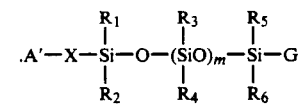

which is mixed with said second monomer charge, to said energy source;

(g) maintaining the exposure of (f) until the free radically polymerizable monomer polymerizes with the free radical

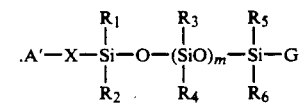

to form a free radical block copolymer segment represented by the formula

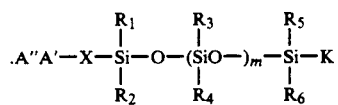

wherein
A″ represents a polymer block consisting essentially of polymerized free radically polymerizable second monomer;
K is selected from the group consisting of -X-A′-A″ and -Z; and
(h) terminating the exposure of (f) whereby

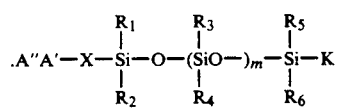

and T. combine to form a block copolymer represented by the formula

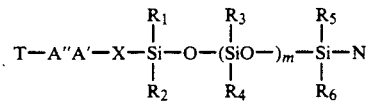

wherein N is selected from the group consisting of -X-A′A‴T and -Z.

The above method describes the preparation of AB, ABA, CAB, and CABAC block copolymers.

In order to form a block copolymer having AB architecture, a monoiniferter compound is used in conjunction with a first monomer charge only. In order to form a block copolymer having ABA architecture, a diiniferter compound is used in conjunction with a first monomer charge only.

In order to form CAB and CABAC block copolymers both the first monomer charge and second monomer charge are used. In order to form a block copolymer having CAB architecture a monoiniferter compound is used in conjunction with the first monomer charge and a second monomer charge. In order to form a block copolymer having CABAC architecture a diiniferter compound is used in conjunction with a first monomer charge and a second monomer charge.

As indicated above, in forming block copolymers having more complicated architecture such as CAB and CABAC the exposure can be terminated in step (d) and a second monomer charge can be added, or alternatively the exposure can be maintained during the addition of the second monomer charge.

The decision whether to terminate exposure typically depends on the type of equipment used to carry out the polymerization. If a sealed vessel is used as in the Examples, exposure will be terminated while the sealed vessel is opened and the second monomer charge is added to the reaction vessel, which is then resealed. However, if a continuous polymerization procedure is utilized it is not necessary to terminate the exposure to the energy source in order to add the second monomer charge.

More complex architecture such as DCABACD, etc., or DCAB, etc., can be obtained by adding additional monomer charges to the reaction vessel and following the procedure described above.

The block copolymers of the present invention may, when necessary or desirable, be blended with a compatible modifier in order to optimize physical properties. The use of such modifiers is common in the art. For example, it may be desirable to include such materials as pigments, fillers, stabilizers, or various polymeric additives.

It should be noted that, while the block copolymers of the present invention have improved toughness without subsequent cross-linking, if necessary, further solvent resistance and resistance to photochemical or oxidative forces may be obtained by cross-linking by employing radiant energy or chemical procedures.

EXAMPLES

The following detailed description includes exemplary preparations of siloxane iniferter compounds and siloxane block copolymers in accordance with the invention. All parts and percentages in the examples are by weight unless otherwise specified.

Definitions of Terms

The number-average molecular weight ($M_n$), and weight-average molecular weight ($M_w$), are well known mathematical descriptions of the molecular weight distribution of a polymer sample.

The polydispersity, abbreviated $\rho$ is a measure of the molecular weight distribution of a polymer and is defined as $\overline{M_w}/\overline{M_n}$.

The glass transition temperature ($T_g$) is a well known temperature at which amorphous material changes from a glassy state to a ductile state.

The crystal melting temperature ($T_m$) is a well known temperature at which a crystalline polymer passes from a crystalline state to a amorphous state.

Each of the foregoing is a well known term used by polymer chemists and others. Further explanation of the derivation of these terms may be found in *Experimental Methods in Polymer Chemistry*, Wiley and Sons, 1981, Chapter 3 entitled "Molecular Weight Averages", pages 57-61.

The block copolymers of the present invention are described in a short-hand way depending upon the monomer forming each block. For example, MMA-b-PDMS-b-MMA refers to a copolymer having blocks ("b") of polymerized methyl methacrylate ("MMA") and one block of polymerized dimethyl siloxane ("PDMS"). For example, MMA-b-PDMS-b-MMA refers to an ABA block copolymer having two A (polymethyl methacrylate) end blocks and a single B midblock (polydimethyl siloxane).

AB block copolymers can also be described in this short-hand way. For example, MMA-b-PDMS refers to an AB block copolymer having one block of polymerized methyl methacrylate ("MMA") and one block of polymerized dimethylsiloxane ("PDMS").

Test Methods

The test methods used to evaluate the block copolymers of the examples are industry standard tests. The test methods which characterize the polymers of this invention are those which demonstrate its molecular architecture. The gel permeation chromatography (GPC) and differential scanning calorimetry (DSC) measurement results have been obtained. The standard tests are described in detail in various publications of the American Society for Testing and Materials (ASTM), Philadelphia, Pa. The standard test methods are described in detail below. The reference source of each of the standard test methods is also given.

Gel Permeation Chromatography

The characterization of the molecular weight distribution of the polymers has been by conventional gel permeation chromatography (GPC).

A Hewlett-Packard Model 1084B, high performance liquid chromatograph equipped with Styragel TM columns was used. The system was calibrated using polystyrene standards. All molecular weight averages are polystyrene equivalent molecular weights. The molecular weight averages and polydispersities were calculated according to accepted practices. GPC test methods are further explained in "Modern Size Exclusion Liquid Chromatography" *Practice of Gel Permeation Chromatography*, John Wiley and Sons, 1979.

Differential Scanning Calorimetry

One gram of the block copolymer of interest was dissolved in 1.5 grams of an appropriate organic solvent, cast into a 70 mm diameter aluminum dish and dried in an air forced oven at 155° C. for 30 minutes. A small amount of the resulting sample was placed in the DSC chamber of a Perkin-Elmer DSC−2 differential scanning calorimeter under nitrogen atmosphere. The sample was cooled from room temperature to −150° C. with liquid nitrogen and then heated to 150° C. at 20° C. per minute. The $T_g$ was taken as the midpoint of the curve in the glass transition region.

Thin Layer Chromatography

Thin layer chromatography is described in a chapter entitled "Polymer Separation and Characterization by Thin-Layer Chromatography", by Hiroshi Inagaki, Kyoto University Kyoto, published in "Advances in Polymer Science", Vol. 24, Springer-Verlage Berlin Heidelberg, 1977.

A. Synthesis of "Macro" Siloxane Diiniferter Compound

Examples 1-5 describe the synthesis of a "macro" siloxane diiniferter compound which can be used in the preparation of ABA, CABAC, DCABACD etc. block copolymers.

The first step involved in the synthesis of a "macro" siloxane diiniferter compound is the synthesis of an end blocker. Example 1 below describes the synthesis of the end blocker, 1,3-bis(2-p,m-chloromethyl phenyl ethyl-1,1,3,3-tetramethyl disiloxane (I).

EXAMPLE 1

Synthesis of End Blocker, Bis 1,3-(2-p,m-chloromethyl phenyl ethyl) −1,1,3,3-tetramethyl disiloxane (I)

A 250 milliliter round-bottomed flask equipped with a stirrer and a drying tube, was charged with 0.147 moles of 1-(dimethylchlorosilyl)-2-(p,m-chloromethyl phenyl)ethane,

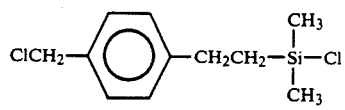

(available from Huls America Inc., formerly Petrarch Systems), and an excess of water (5 grams). Although a mixture of para and meta compound was used, the reaction equations are drawn only showing the para compound in order to simplify the diagrams. The flask contents were stirred for about 3-4 hours. The resulting mixture was transferred to a separatory funnel. One hundred milliliters of ether and 100 milliliters of distilled water were added to the separatory funnel, after which the separatory funnel was shaken vigorously for a period of 30 seconds. The mixture contained in the separatory funnel was then left to stand for several minutes to allow a water layer and an ether layer to form. The water layer was then rejected from the separatory funnel. An additional 100 milliliters of distilled water was added to the remaining ether layer and the extraction process was repeated. Ether was evaporated from the remaining layer by use of a rotary evaporator. The end blocker (I) was obtained at a yield of 80-85 percent. The purity of the end blocker compound was evaluated by means of thin layer chromatography (silica) wherein $CHCl_3$ was used as the solvent.

The reaction of Example 1 can be represented as follows:

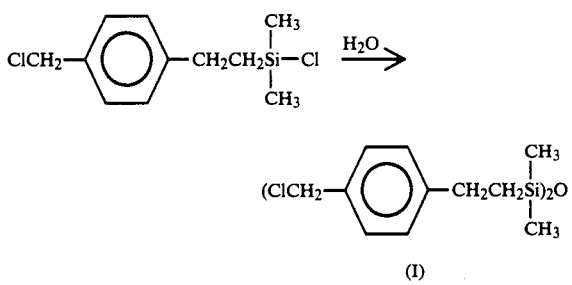

The second step involved in the synthesis of "macro" siloxane diiniferter compound is the synthesis of a siloxane precursor using an end blocker. Examples 2, 3 and 4 are representative of the synthesis of siloxane precursor (II) by use of end blocker (I). Examples 2–4 below demonstrate the effects of the octamethylcyclotetrasiloxane "$D_4$" to end blocker (I) ratio.

EXAMPLES 2–4

Synthesis Of Siloxane Precursor (II) Using End Blocker (I)

EXAMPLE 2

Into a 1-liter 3-neck round bottom flask were charged 68 grams of octamethylcyclotetrasiloxane, referred to herein as "$D_4$", 6.74 grams of end blocker (I) prepared according to Example 1, and 0.68 gram of Darco G60® carbon black available from EM® Science (a subsidiary of VWR Scientific). The reaction mixture was agitated for approximately 10 minutes until a uniform distribution of carbon black in the solution was achieved. Next, 0.06 gram of $H_2SO_4$, which acts as a catalyst, (roughly 0.08 percent of $H_2SO_4$) was added for the acid equilibration reaction.

The resulting mixture was heated at 90° C. for about 5 hours, dry nitrogen being purged throughout the reaction. The carbon black, on which $H_2SO_4$ was absorbed, was removed by filtering the mixture under $N_2$ pressure. Approximately 90 percent conversion was obtained. The 15 percent cyclics, the majority of which is $D_4$, followed by $D_5$, $D_6$, etc., were stripped off using a water aspirator during which time the flask contents were held at 150° C.

EXAMPLE 3

The procedure of Example 2 was repeated. The charges of "$D_4$", carbon black, concentrated $H_2SO_4$, and end blocker (I) were as follows: "$D_4$"(825 grams), carbon black (10 grams), concentrated $H_2SO_4$ (0.66 grams) and end blocker (I) (75 grams). This mixture was heated under the flow of dry nitrogen at 90° C. for about 8 hours. The 15 percent cyclics were stripped off using a water aspirator during which time the flask contents were held at 150° C.

EXAMPLE 4

The procedure of Example 2 was repeated. The charges of "$D_4$", carbon black, concentrated $H_2SO_4$, and end blocker (I) were as follows: "$D_4$"(136.0 grams), carbon black (2.0 grams), concentrated $H_2SO_4$ (0.11 grams), and end blocker I (2.0 grams). The mixture was heated under the flow of dry nitrogen at 90° C. for about 16 hours. The 15 percent cyclics were stripped off using a water aspirator during which time the flask contents were held at 150° C.

The reactions of Examples 2–4 can be represented as follows:

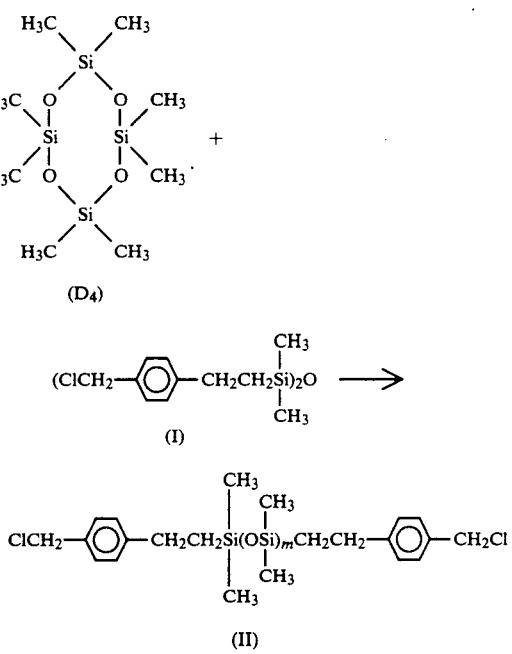

Table I below demonstrates the effects of octamethylcyclotetrasiloxane ($D_4$) to end blocker (I) ratio and the extent of heating at 90° C. on the molecular weight of siloxane precursor (II) formed.

TABLE I

| Example | Ratio of $D_4$ to End Blocker (I) | Mn | Mw | p |
| --- | --- | --- | --- | --- |
| 2 | 10:1 | 2,520 | 6,130 | 2.430 |
| 3 | 11:1 | 3,797 | 6,997 | 1.842 |
| 4 | 68:1 | 30,195 | 54,421 | 1.802 |

The third step in the synthesis of "macro" siloxane diiniferter compound is the placement of a photoiniferter on the siloxane precursor (II). Example 5 sets forth the procedure utilized in synthesizing "macro" siloxane-diiniferter compound (III) using the siloxane precursor (II) of Example 3. The same procedure can be followed in synthesizing "macro" siloxane-diiniferter compounds (III) from the siloxane precursors (II) prepared according to Examples 2 and 4.

EXAMPLE 5

Reaction of Sodium Diethyl Dithiocarbamate Trihydrate, With Siloxane Precursor (II) To Form "Macro" Siloxane Diiniferter Compound (III)

Into a 1-liter vessel were charged 250 grams of tetrahydrofuran (THF), followed by 120 grams (0.04 mole) of the siloxane precursor (II) formed according to Example 3, and 20 grams (0.09 mole) of sodium diethyldithiocarbamate trihydrate. The vessel contents were stirred for about 4–5 hours at room temperature. Precipitation of sodium chloride was observed and tetrahydrofuran was evaporated off on a rotary evaporator. The resulting mixture was transferred to a separatory funnel. Three hundred grams of ether and 300 grams of distilled water were added to the separatory funnel. The separatory funnel was shaken vigorously and left to stand for several minutes to allow an ether layer and a water layer to form. The water layer was then rejected from the separatory funnel. An additional 300 grams of distilled water was added to the separatory funnel and the extraction process was repeated. This extraction process was repeated until the ether layer was cloud-free. The ether layer was dried over magnesium sulfate for about 2 hours. Finally, ether was evaporated off on a rotary evaporator in order to obtain "macro" siloxane-diiniferter compound (III). The reaction was monitored with proton NMR.

The reaction of Example 5 can be represented as follows:

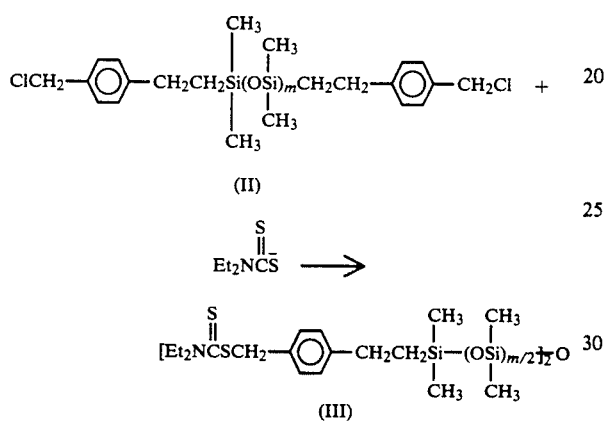

The "macro" siloxane-diiniferter compounds described above can be used in the synthesis of ABA block copolymers wherein A represents a vinyl segment of the block copolymer and B represents a siloxane midsegment. Examples 7 and 8 describe the synthesis of ABA block copolymers using the "macro" siloxane diinferter compound prepared according to Example 5. Example 9 describes the synthesis of a C-A-B-A-C block copolymer using a "macro" siloxane diiniferter compound prepared according to Example 5.

B. Synthesis of "Macro" Siloxane-Monoiniferter Compound

Example 6 describes the synthesis of a "macro" siloxane-monoiniferter compound which can be used in the preparation of AB, CAB, DCAB, etc. block copolymers.

EXAMPLE 6

Synthesis Of "Macro" Siloxane Monoiniferter Compound

The first step in the synthesis of "macro" siloxane-monoiniferter compound was the synthesis of a macromolecular anion, lithium polydimethylsilanolate (IV) by anionic polymerization.

A 1-liter reaction vessel equipped with an automatic stirring mechanism was charged with hexamethyl cyclotrisiloxane, referred to herein as "D$_3$", 91 grams, (0.41 mole), lithium trimethylsilanolate, Me$_3$SiOLi, 11.8 grams, (0.0186 mole) and 250 grams of tetrahydrofuran (THF) (30 percent solid). The vessel contents were stirred continuously at 0° C. for approximately 18 hours during which time the macromolecular anion, lithium polydimethylsilanolate (IV) was formed. The stirring was discontinued after almost all of the "D$_3$" was consumed. Gas chromatography was used to monitor the consumption of "D$_3$" in the reaction.

The reaction can be represented as follows:

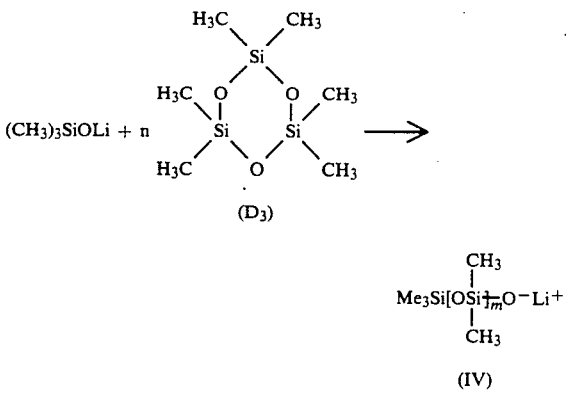

The next step involved the addition of 1-(dimethyl-chlorosilyl)−2-(p,m-chloromethylphenyl) ethane, ClCH$_2$C$_6$H$_4$CH$_2$CH$_2$SiCl(CH$_3$)$_2$, available from Huls America Inc., 18 grams, (0.04 mol) to the above solution, after which the resulting mixture was stirred for 2 hours at room temperature. Precipitation of lithium chloride was observed. The solution containing lithium chloride and unreacted 1-(Dimethylchlorosilyl)−2(-p, m-chloromethylphenyl) ethane in addition to siloxane precursor (V) was transferred to a separatory funnel. One hundred milliliters of CH$_3$OH was added to the separatory funnel, which was shaken vigorously. The separatory funnel containing the mixture was then left to stand for several minutes. The CH$_3$OH layer was then rejected from the separatory funnel. Tetrahydrofuran (THF) was evaporated off on a rotary evaporator. The siloxane precursor (V) was obtained at a 90-95 percent yield. The synthesis was monitored by the testing of aliquots by the use of proton NMR.

The reaction of (IV) with 1-(dimethylchlorosilyl)-2-(p,m-chloromethylphenyl)ethane to obtain siloxane precursor (V) can be represented as follows:

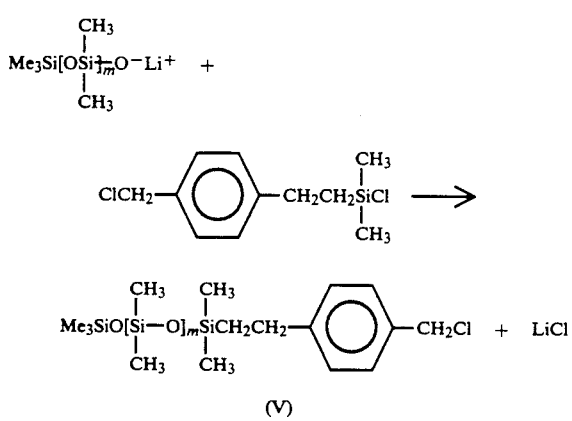

The final step involved in the synthesis of the macro siloxane monoiniferter compound involved the placement of a photoiniferter on the siloxane precursor (V) to obtain macro siloxane-monoiniferter compound (VI).

Siloxane precursor (V) (5000 molecular weight) (0.0182 mole) and an excess of sodium diethyldithiocarbamate Et$_2$NCS$_2$$^-$Na$^+$) (6 grams) were stirred for 4–5 hours using THF as the solvent. Precipitation of sodium chloride was observed. THF was evaporated off on a rotary evaporator. A substantial amount of white solid along with the desired "macro" siloxane monoiniferter compound (VI) was obtained. The presence of the white solid was due to the formation of sodium chloride and an excess of sodium diethyldithiocarbamate. The solution was filtered using a Buchner funnel. Siloxane monoiniferter compound (VI) was obtained at a 90 percent yield. Proton NMR was used to monitor the reaction. Gel permeation chromatography of the siloxane monoiniferter compound (VI) showed a Mn=7269, a Mw=8466 and a polydispersity=1.16. Differential scanning calorimetry showed a $T_g$ of $-123°$ C.

The placement of the photoiniferter on the siloxane precursor (V) to obtain the "macro" siloxane-monoiniferter compound (VI) can be represented as follows:

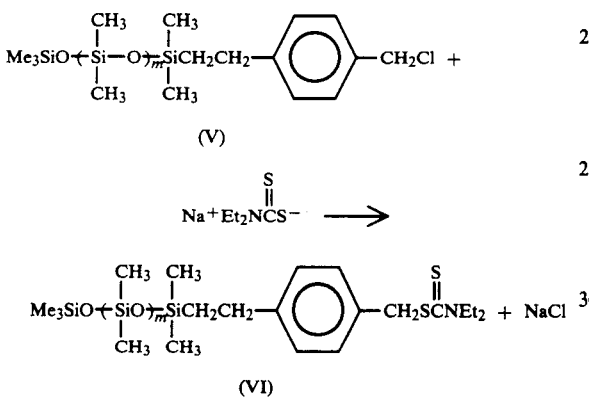

Examples 7 and 8 are representative of the photopolymerized, siloxane-acrylic block copolymers of the invention having triblock architecture. The end blocks are firmer, having a higher glass transition temperature ($T_g$). The siloxane midblock is more elastic, having a lower $T_g$. Example 9 is representative of the photopolymerized siloxane-acrylic copolymer of the invention having CABAC architecture. All parts and percentages are by weight unless otherwise indicated.

C. Synthesis of Block Copolymers Utilizing "Macro" Siloxane Diiniferter Compounds

EXAMPLE 7

MMA-b-PDMS-b-MMA

A 250 milliliter cylindrical reaction bottle was charged with 17 grams of 3000 molecular weight "macro" siloxane-diiniferter compound (III) prepared according to Example 5, 38.6 grams of methyl methacrylate (MMA) monomer and 85 grams of ethyl acetate (solvent). The mixture was purged with nitrogen for 3 to 4 minutes before sealing and placing the sealed bottle in a roller mechanism. The rotating, sealed bottle was exposed for 24 hours to ultraviolet radiation from 6 General Electric 15 watt cylindrical black light lamps. During the period of polymerization the reaction was monitored by the testing of aliquots by use of a nuclear magnetic resonance (NMR) spectrophotometer. When the vinyl peak was no longer detectable, the ultraviolet radiation source was turned off. The reaction bottle was removed from the roller mechanism, and unsealed to determine the exact conversion by measuring the percent solids. Conversion in the range of 92-95 percent was obtained. Differential scanning calorimetry (DSC) and gel permeation chromatography (GPC) results for this example are reported in Table II, Example 7.

EXAMPLE 8

$(MA/AA)_x$-b-PDMS-b-$(MA/AA)_x$

A 250 milliliter cylindrical reaction bottle was charged with 5 grams of 3000 molecular weight macro siloxane-diiniferter compound (III), prepared according to Example 5, 7.25 grams of methyl acrylate (MA), 3.25 grams of acrylic acid (AA), and 17 grams of ethyl acetate. The mixture was purged with nitrogen for 3 to 4 minutes before sealing and placing the sealed bottle in a roller mechanism. The rotating sealed bottle was exposed for 2.5 hours to radiation from 6 General Electric 15 watt cylindrical black light lamps. After 2.5 hours of photolysis the solution became milky as the polymer started to precipitate out of solution. 19.6 grams of methanol was added and the resulting homogeneous solution was photolyzed an additional 10 hours to obtain 96 percent conversion.

The resulting copolymer was characterized by differential scanning calorimetry (DSC) and gel permeation chromatography (GPC), the results of which are reported in Table II, Example 8.

EXAMPLE 9

HEA-b-MMA-b-PDMS-b-MMA-b-HEA

A cylindrical reaction bottle was charged with 3.8 grams of approximately 3000 molecular weight macro siloxane-diiniferter compound (III) prepared according to Example 5, 4 grams of methyl methacrylate (MMA) and 15 grams of ethyl acetate. The reaction bottle contents were photopolymerized according to the procedure followed in Examples 7 and 8 in order to obtain MMA-b-PDMS-b-MMA. The reaction bottle was then removed from the roller mechanism and unsealed, to permit the addition of a second monomer. Next, 3.8 grams of the second monomer, hydroxyethyl acrylate (HEA), and an additional 15 grams of ethyl acetate were added to the reaction mixture. The reaction bottle thus charged was purged with nitrogen for 3 to 4 minutes, before resealing and placing the resealed bottle in the roller mechanism and subjecting the bottle to 8 hours of additional ultraviolet radiation. The extent of conversion was monitored by measuring the percent solids. Conversion in the range of 90 percent was obtained. The resulting segmented copolymer was characterized by differential scanning calorimetry (DSC) and gel permeation chromatography (GPC), the results of which are reported in Table II, Example 9.

TABLE II

| Ex. No. | Copolymer Composition | Mn | Mw | Mw/Mn | $T_g$ (°C.) |
|---|---|---|---|---|---|
| 7 | MMA-b-PDMS-b-MMA | 17,154 | 30,853 | 1.761 | −124 +105 |
| 8 | $(MA/AA)_x$-b-PDMS-$(MA/AA)_x$ | 22,200 | 53,000 | 2.39 | −126 +60 |
| 9 | HEA-b-MMA-b-PDMS-b-MMA-b-HEA | 13,162 | 20,644 | 1.56 | −120 +107 |
| 10 | MMA-b-PDMS | 15,416 | 20,394 | 1.33 | −124 +106 |

D. Synthesis of Block Copolymers Utilizing Macro Siloxane Monoiniferter Compounds Example 10 is representative of photopolymerized vinyl-siloxane block copolymers of the invention having diblock (AB) structures. All parts and percentages are by weight unless otherwise indicated.

EXAMPLE 10

MMA-b-PDMS

A cylindrical reaction bottle was charged with 4.34 grams of 7000 molecular weight macro siloxane-monoiniferter compound prepared according to Example 6, 5.1 grams of methyl methacrylate (MMA), and 22.8 grams of ethyl acetate. The mixture was purged with nitrogen for 3–4 minutes before sealing and placing the sealed bottle in a roller mechanism. The rotating, sealed bottle was exposed for 22 hours to ultraviolet radiation from 6 General Electric 15 watt cylindrical black light lamps. During the period of polymerization, the reaction was monitored by the testing of aliquots by use of a nuclear magnetic resonance spectrophotometer. When the vinyl peak was no longer detectable, the ultraviolet radiation source was turned off. The reaction bottle was removed from the roller mechanism and unsealed to determine the exact conversion by measuring the percent solids. Conversion in the range of 98 percent was obtained. The resulting copolymer was characterized by differential scanning calorimetry (DSC) and gel permeation chromatography (GPC), the results of which are reported in Table II, Example 10.

The reaction of Example 10 can be represented as follows

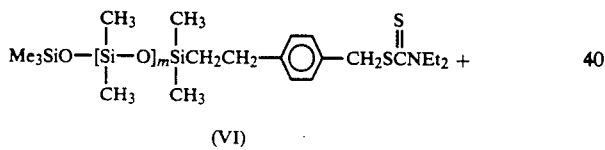

(VI)

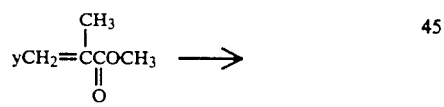

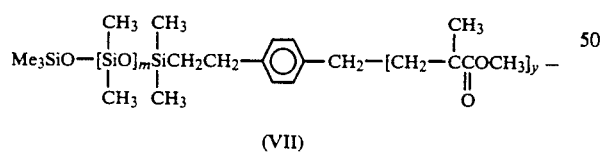

(VII)

While this invention has been described in connection with specific embodiments, it should be understood that it is capable of further modification. The claims herein are intended to cover those variations which one skilled in the art would recognize as the chemical equivalent of what has been described here.

What is claimed is:

1. A siloxane iniferter compound represented by the general formula

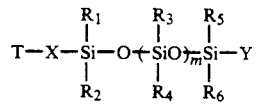

wherein

T and X are organic groups selected so that the T-X bond is capable of dissociating upon being subjected to a radiant energy source to form a terminator free radical of the formula T and an initiator free radical of the formula

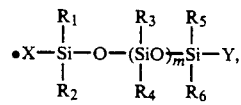

said initiator free radical being sufficiently reactive to initiate free radical polymerization of free radically polymerizable monomer and said terminator free radical being insufficiently capable of initiating free radical polymerization of free radically polymerizable monomer but capable of rejoining with said initiator free radical or a free radical polymer segment free radically polymerized with said initiator free radical;

wherein T is

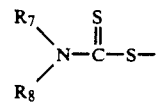

wherein $R_7$ and $R_8$ are monovalent moieties selected from the group consisting of hydrogen, $C_{1-4}$ alkyl, $C_{1-4}$ fluoroalkyl including at least one fluorine atom, aryl and substituted aryl, $R_7$ and $R_8$ being the same or different and being selected so that they will not prevent said initiator free radical from initiating free radical polymerization or the combining of said terminator free radical with said initiator free radical or a polymer free radical segment including said initiator free radical; or wherein T is

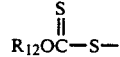

wherein $R_{12}$ is a monovolent moiety selected from the group consisting of hydrogen, $C_{1-4}$ alkyl, aryl and substituted aryl;

wherein -X- is a divalent species selected from the group consisting of alkylene, arylalkene, and arylene; or wherein -X- is a divalent species having the general formula

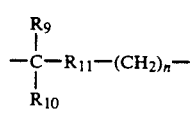

wherein $R_9$ and $R_{10}$ can be the same or different and are selected from the group consisting of hydrogen and $C_{1-6}$ alkyl, $R_{11}$ is a divalent species selected from the group consisting of $C_{1-7}$ alkylene and phenylene, and n is an integer of at least 1; or wherein X is selected from the group consisting of

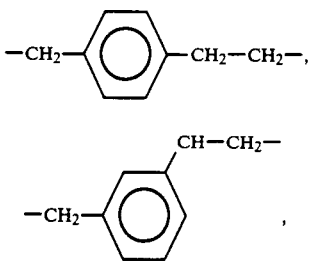

and mixtures thereof;

$R_1$, $R_2$, $R_5$ and $R_6$ are monovalent moieties selected from the group consisting of hydrogen, $C_{1-4}$ alkyl, $C_{1-4}$ alkoxy and aryl which can be the same or different;

$R_3$ and $R_4$ are monovalent moieties which can be the same or different selected from the group consisting of hydrogen, $C_{1-4}$ alkyl, $C_{1-4}$ fluoroalkyl including at least one fluorine atom and aryl;

$R_1$, $R_2$, $R_3$, $R_4$, $R_5$ and $R_6$ are selected so that they do not prevent said initiator free radical from initiating free radical polymerization or the combining of said terminator free radical with said initiator free radical or a polymer free radical segment including said initiator free radical;

Y is selected from the group consisting of -X-T and -Z wherein X and T are defined above and Z is an organic moiety that will not dissociate to form free radicals when subjected to said energy source; and m is an integer of at least 10.

2. The iniferter of claim 1 wherein T is

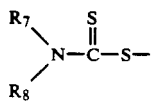

wherein $R_7$ and $R_8$ are monovalent moieties selected from the group consisting of hydrogen, $C_{1-4}$ alkyl, $C_{1-4}$ fluoroalkyl including at least one fluorine atom, aryl and substituted aryl, $R_7$ and $R_8$ being the same or different and being selected so that they will not prevent said initiator free radical from initiating free radical polymerization or the combining of said terminator free radical with said initiator free radical or a polymer free radical segment including said initiator free radical.

3. The iniferter of claim 2 wherein $R_7$ and $R_8$ are ethyl moieties.

4. The iniferter of claim 1 wherein m is an integer of from about 10 to about 100.

5. The iniferter of claim 1 wherein -X- is a divalent species selected from the group consisting of alkylene, arylalkene, and arylene.

6. The iniferter of claim 1 wherein -X- is a divalent species having the general formula

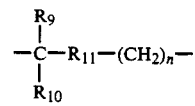

wherein $R_9$ and $R_{10}$ can be the same or different and are selected from the group consisting of hydrogen and $C_{1-6}$ alkyl, $R_{11}$ is a divalent species selected from the group consisting of $C_{1-7}$ alkylene and phenylene, and n is an integer of at least 1.

7. The iniferter of claim 1 wherein x is selected from the group consisting of

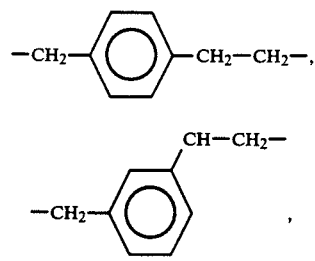

and mixtures thereof.

8. The iniferter of claim 1 wherein Z is selected from group consisting of alkyl, alkoxy, alkylamino, aryl, hydroxyl, and fluoroalkyl.

* * * * *